United States Patent
Johnson et al.

(10) Patent No.: US 11,006,567 B2
(45) Date of Patent: May 18, 2021

(54) SYSTEM AND METHOD FOR CONTROLLING THE OPERATION OF A SEED-PLANTING IMPLEMENT BASED ON THE OPERATION OF ITS FURROW-CLOSING ASSEMBLY

(71) Applicant: CNH Industrial America LLC, New Holland, PA (US)

(72) Inventors: Chad M. Johnson, Arlington Heights, IL (US); Trevor Stanhope, Palos Hills, IL (US); Christopher Schoeny, Yorkville, IL (US)

(73) Assignee: CNH Industrial America LLC, New Holland, PA (US)

( * ) Notice: Subject to any disclaimer, the term of this patent is extended or adjusted under 35 U.S.C. 154(b) by 215 days.

(21) Appl. No.: 16/388,558

(22) Filed: Apr. 18, 2019

(65) Prior Publication Data

US 2020/0329631 A1 Oct. 22, 2020

(51) Int. Cl.
*A01C 7/20* (2006.01)
*A01B 49/06* (2006.01)
(Continued)

(52) U.S. Cl.
CPC ............. *A01C 7/205* (2013.01); *A01B 49/06* (2013.01); *A01B 63/008* (2013.01); *A01C 5/066* (2013.01)

(58) Field of Classification Search
CPC ....... A01B 49/06; A01B 63/008; A01C 5/066; A01C 7/203; A01C 7/205
See application file for complete search history.

(56) References Cited

U.S. PATENT DOCUMENTS 8,544,398 B2 10/2013 Bassett
8,763,713 B2 7/2014 Bassett
(Continued)

FOREIGN PATENT DOCUMENTS

EP 0372901 6/1990
WO WO 2017197274 11/2017
WO WO 2018083525 5/2018

OTHER PUBLICATIONS

Dobberstein, John, "Precision Planting Unveils Seed Depth, Furrow Closing Techologies," Farm-Equipment.com, https://www.farm-equipment.com/articles/16581-precision-planting-unveils-seed-depth-furrow-closing-technologies, Jan. 17, 2019, 16 pages.

*Primary Examiner* — Thomas B Will
*Assistant Examiner* — Ian Alexander Normile
(74) *Attorney, Agent, or Firm* — Rebecca L. Henkel; Rickard K. DeMille

(57) ABSTRACT

A system for controlling the operation of a seed-planting implement may include a furrow-closing assembly having a closing disc. A controller of the system may be configured to determine when a penetration depth of the closing disc falls outside a predetermined depth range based on data received from a depth sensor. The controller may also be configured to control the operation of an actuator to adjust a down pressure applied to the closing disc to return the monitored penetration depth to within the predetermined depth range. Furthermore, the controller may be configured to determine an operational adjustment to be made to an additional tool of the seed-planting implement based on the adjustment made to the down pressure applied to the closing disc. In addition, the controller may be configured to control the operation of the additional tool to execute the operational adjustment.

20 Claims, 5 Drawing Sheets

(51) Int. Cl.
  *A01C 5/06*   (2006.01)
  *A01B 63/00*  (2006.01)

(56) References Cited

U.S. PATENT DOCUMENTS

| | | |
|---|---|---|
| 8,910,582 B2 | 12/2014 | Mariman et al. |
| 8,985,232 B2 | 3/2015 | Bassett |
| 9,675,004 B2 | 6/2017 | Landphair et al. |
| 9,706,703 B2 | 7/2017 | Anderson et al. |
| 2012/0048160 A1* | 3/2012 | Adams ............... A01C 5/066 |
| | | 111/163 |
| 2015/0107862 A1 | 4/2015 | Freed |
| 2018/0114305 A1 | 4/2018 | Strnad et al. |
| 2018/0317381 A1 | 11/2018 | Bassett |
| 2018/0336767 A1 | 11/2018 | Barker |
| 2019/0059206 A1* | 2/2019 | Stanhope ............ A01B 63/008 |
| 2019/0373801 A1* | 12/2019 | Schoeny ............ A01B 79/005 |

\* cited by examiner

SYSTEM AND METHOD FOR CONTROLLING THE OPERATION OF A SEED-PLANTING IMPLEMENT BASED ON THE OPERATION OF ITS FURROW-CLOSING ASSEMBLY

FIELD OF THE INVENTION

The present disclosure generally relates to seed-planting implements and, more particularly, to systems and methods for controlling the operation of one or more tools of a seed-planting implement based on the operation of its furrow-closing assembly.

BACKGROUND OF THE INVENTION

Modern farming practices strive to increase yields of agricultural fields. In this respect, seed-planting implements are towed behind a tractor or other work vehicle to disperse seed throughout a field. For example, seed-planting implements typically include one or more furrow-forming tools or openers that excavate a furrow or trench in the soil. One or more dispensing devices of the seed-planting implements may, in turn, deposit the seeds into the furrow(s). After deposition of the seeds, a furrow-closing assembly may close the furrow in the soil, such as by pushing the excavated soil into the furrow. Given the intended function of the furrow-closing assembly, one or more additional or other tools of the seed-planting implement, such as a gauge wheel and/or a residue removal device, may engage the soil prior to the furrow-closing assembly. In this regard, the operation of such tool(s) may affect the operation of the furrow-closing assembly.

Accordingly, an improved system and method for controlling the operation of a seed-planting implement would be welcomed in the technology. More specifically, a system and method for controlling the operation of a seed-planting implement based on the operation of its furrow-closing assembly would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of a seed-planting implement. The system may include a furrow-closing assembly including a closing disc, with the furrow-closing assembly configured to close a furrow formed in the soil by the seed-planting implement. The system may also include an actuator configured to apply a down pressure to the closing disc in a manner that causes the closing disc to penetrate a surface of the soil. Furthermore, the system may include a depth sensor configured to detect a parameter indicative of a penetration depth of the closing disc and a down pressure sensor configured to detect a parameter indicative of the down pressure applied to the closing disc. Additionally, the system may include a controller communicatively coupled to the depth sensor and the down pressure sensor. The controller may be configured to determine when the penetration depth of the closing disc falls outside a predetermined depth range based on data received from the depth sensor. Moreover, the controller may be configured to control the operation of the actuator to adjust the down pressure applied to the closing disc to return the monitored penetration depth to within the predetermined depth range. Furthermore, the controller may be configured to determine an operational adjustment to be made to an additional tool of the seed-planting implement based on the adjustment made to the down pressure applied to the closing disc. In addition, the controller may be configured to control the operation of the additional tool to execute the operational adjustment.

In another aspect, the present subject matter is directed to a method for controlling the operation of a seed-planting implement. The seed-planting implement may include a furrow-closing assembly including a closing disc, with the furrow-closing assembly configured to close a furrow formed in the soil by the seed-planting implement. The method may include determining, with a computing device, when a penetration depth of the closing disc falls outside a predetermined depth range. The method may also include controlling, with the computing device, the operation of an actuator to adjust a down pressure applied to the closing disc to return the monitored penetration depth to within the predetermined depth range. Furthermore, the method may include determining, with the computing device, an operational adjustment to be made to an additional tool of the seed-planting implement based on the adjustment made to the down pressure applied to the closing disc. Additionally, the method may include controlling, with the computing device, the operation of the additional tool to execute the operational adjustment.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
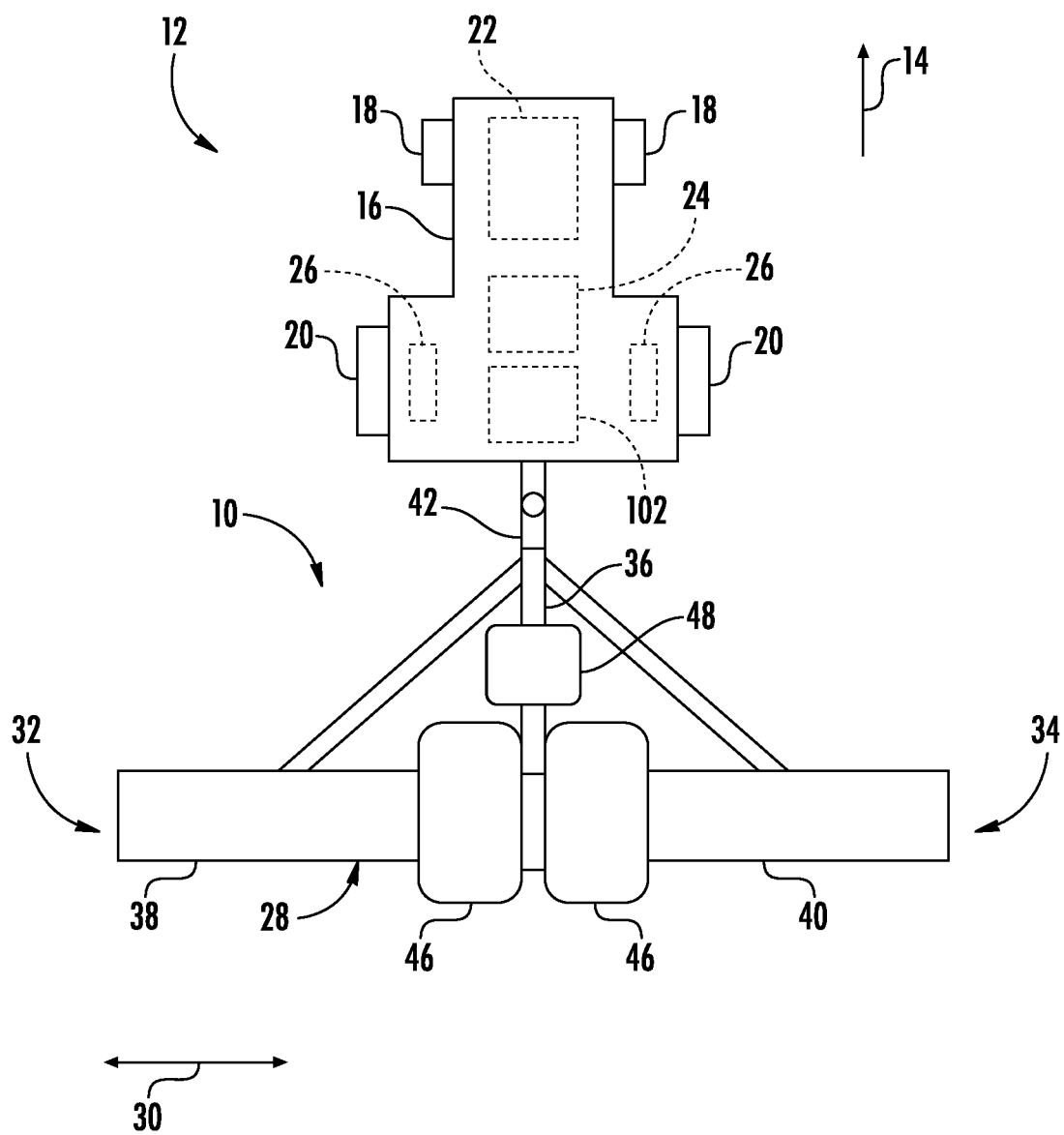
FIG. 1 illustrates a top view of one embodiment of a seed-planting implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of a seed-planting implement. Specifically, in several embodiments, a controller of the disclosed system may be configured to monitor the penetration depth of a closing disc(s) of the seed-planting implement. The closing disc(s) may, in turn, be configured to close a furrow formed in the soil by the seed-planting implement after seeds have been deposited therein. When the monitored penetration depth of the closing disc(s) falls outside of a predetermined depth range, the closing disc(s) may be improperly closing the furrow, thereby resulting in poor seed-to-soil contact. In such instances, the controller may be configured to control the operation of an actuator of the seed-planting implement to adjust the down pressure applied to the closing disc(s) to return the monitored penetration depth to within the predetermined depth range. For example, when the monitored penetration depth is too shallow, the controller may control the actuator to increase the down pressure applied to the closing disc(s) such that the penetration depth of such disc(s) increases. Conversely, the controller may control the actuator to reduce the down pressure applied to the closing disc(s) when the monitored penetration depth is too deep, thereby decreasing the penetration depth of such disc(s).

In accordance with aspects of the present subject matter, the controller may be configured to control the operation of one or more additional tools (e.g., a gauge wheel or a residue removal device) of the seed-planting implement based on the adjustment to the down pressure applied to the closing disc(s). More specifically, the controller may determine an operational adjustment to be made to the additional tool(s) based on the adjustment made to the down pressure applied to the closing disc(s). Thereafter, the controller may be configured to control the operation of the additional tool(s) to execute the operational adjustment. For example, in one embodiment, when the down pressure applied to the closing disc(s) is increased, the controller may determine that the down pressure applied to a gauge wheel of the seed-planting implement is too high (thereby causing too much soil compaction) and should be reduced. As such, the controller may be configured to control the operation of an actuator of the seed-planting implement to reduce the down pressure applied to the gauge wheel.

Figure 2:
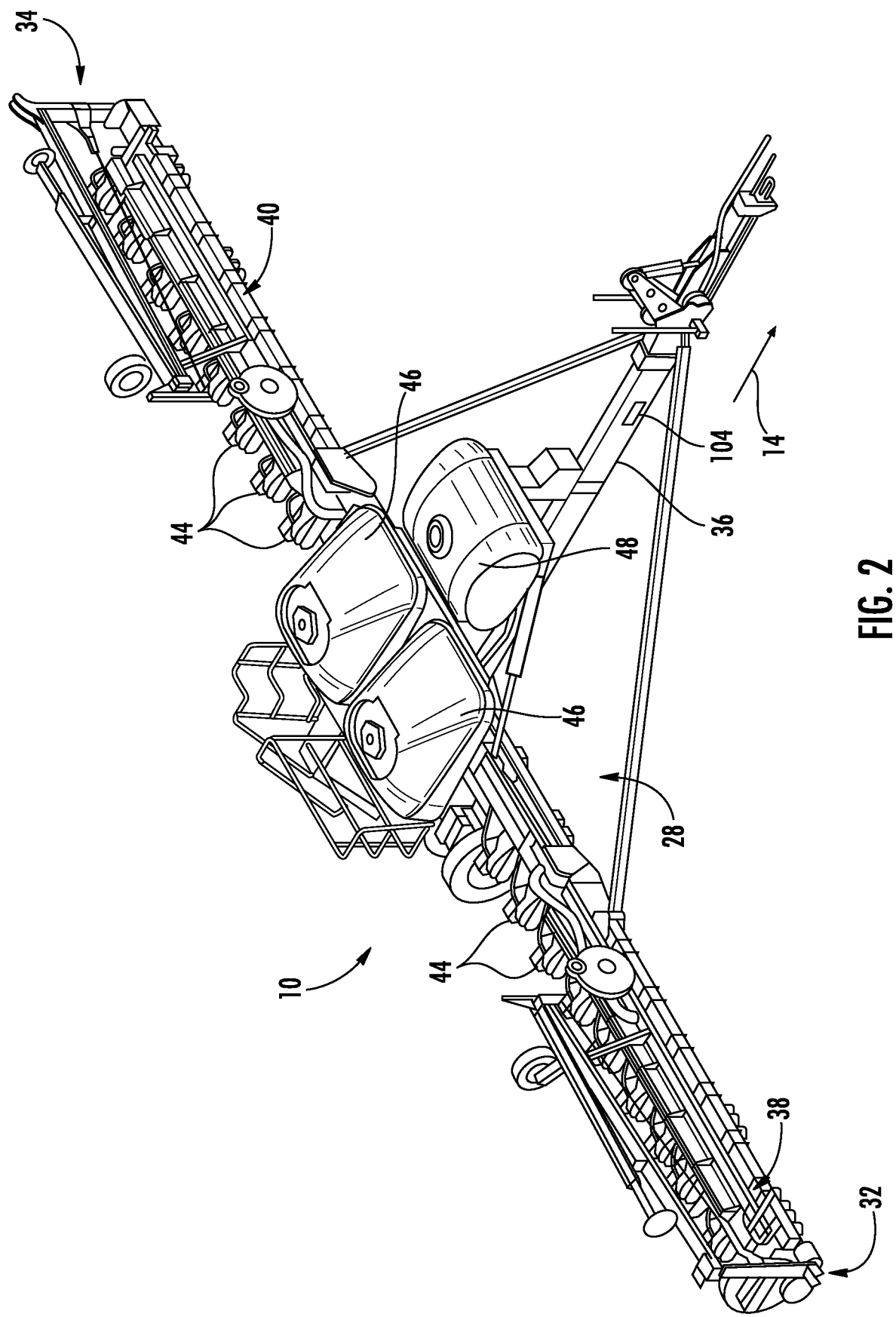
FIG. 2 illustrates a perspective view of the seed-planting implement shown in FIG. 1, particularly illustrating various components of the implement.

Referring now to the drawings, FIGS. 1 and 2 illustrate differing views of one embodiment of a seed-planting implement 10 in accordance with aspects of the present subject matter. Specifically, FIG. 1 illustrates a top view of the seed-planting implement 10 coupled to a work vehicle 12. Additionally, FIG. 2 illustrates a perspective view of the implement 10, particularly illustrating various components of the implement 10.

In general, the vehicle 12 may be configured to tow the implement 10 across a field in a direction of travel (e.g., as indicated by arrow 14 in FIG. 1). As shown, the vehicle 12 may be configured as an agricultural tractor and the implement 10 may be configured as an associated planter. However, in other embodiments, the vehicle 12 may be configured as any other suitable type of vehicle, such as an agricultural harvester, a self-propelled sprayer, and/or the like. Similarly, the implement 10 may be configured as any other suitable type of implement, such as seeder (e.g., a seed disc drill) or another seed dispensing implement, a side dresser or another fertilizer dispensing implement, a strip tiller, and/or the like.

As shown in FIG. 1, the vehicle 12 may include a frame or chassis 16 configured to support or couple to a plurality of components. For example, a pair of steerable front wheels 18 and a pair of driven rear wheels 20 may be coupled to the frame 16. The wheels 18, 20 may be configured to support the vehicle 12 relative to the ground and move the vehicle 12 in the direction of travel 14 across the field. However, it should be appreciated that, in alternative embodiments, the front wheels 18 may be driven in addition to or in lieu of the rear wheels 20. Additionally, it should be appreciated that, in further embodiments, the vehicle 12 may include track assemblies (not shown) in place of the front and/or rear wheels 18, 20.

Furthermore, the vehicle 12 may include one or more devices for adjusting the speed at which the vehicle 12 moves across the field in the direction of travel 14. Specifically, in several embodiments, the work vehicle 12 may include an engine 22 and a transmission 24 mounted on the frame 16. In general, the engine 22 may be configured to generate power by combusting or otherwise burning a mixture of air and fuel. The transmission 24 may, in turn, be operably coupled to the engine 22 and may provide variably adjusted gear ratios for transferring the power generated by the engine 22 to the driven wheels 20. For example, increasing the power output by the engine 22 (e.g., by increasing the fuel flow to the engine 22) and/or shifting the transmission 24 into a higher gear may increase the speed at which the vehicle 12 moves across the field. Conversely, decreasing the power output by the engine 22 (e.g., by decreasing the fuel flow to the engine 22) and/or shifting the transmission 24 into a lower gear may decrease the speed at which the vehicle 12 moves across the field.

Additionally, the vehicle 12 may include one or more braking actuators 26 that, when activated, reduce the speed at which the vehicle 12 moves across the field, such as by converting energy associated with the movement of the vehicle 12 into heat. For example, in one embodiment, the braking actuator(s) 26 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, it should be appreciated that the braking actuator(s) 26 may any other suitable hydraulic, pneumatic, mechanical, and/or electrical component(s) configured to convert the rotation of the rotating element(s) into heat. Furthermore, although FIG. 1 illustrates one braking actuator 26 provided in operative association with each of the driven wheels 20, it should be appreciated that the vehicle 12 may include any other suitable number of braking actuators 26. For example, in one embodiment, the vehicle 12 may include one braking actuator 26 provided in operative association with each of the steerable wheels 18 in addition to or in lieu of the driven wheels 20.

Moreover, as shown in FIG. 1, a location sensor 102 may be provided in operative association with the implement 10 and/or the vehicle 12. For instance, as shown in FIG. 1, the location sensor 102 is installed on or within the vehicle 12. However, in other embodiments, the location sensor 102 may be installed on or within the implement 10. In general, the location sensor 102 may be configured to determine the exact location of the implement 10 and/or the vehicle 12 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a controller(s) of the implement 10 and/or the vehicle 12 (e.g., in the form coordinates) and stored within the controller's memory for subsequent processing and/or analysis. For instance, based on the known dimensional configuration and/or relative positioning between the implement 10 and the vehicle 12, the determined location from the location sensor 102 may be used to geo-locate the implement 10 within the field.

Referring still to FIGS. 1 and 2, the implement 10 may include a frame or toolbar 28 configured to support and/or couple to one or more components of the implement 10. Specifically, in several embodiments, the toolbar 28 may extend along a lateral direction 30 between a first side 32 of the implement 10 and a second side 34 of the implement 10. As shown, the toolbar 28 may include a center section 36 and a pair of wing sections 38, 40. In one embodiment, the wing sections 38, 40 may be pivotably coupled to the center section 36 in a manner that permits the wing sections 38, 40 to fold forward to reduce the lateral width of the implement 10, such as during storage or transportation of the implement 10 on a road. Furthermore, a tow bar 42 may be coupled to the center section 36 to allow the implement 10 to be towed by the work vehicle 12. Additionally, as shown in FIG. 2, the wing sections 38, 40 may generally be configured to support a plurality of seed-planting units (or row units) 44. As will be described below, each row unit 44 may be configured to deposit seeds at a desired depth beneath the soil surface and at a desired seed spacing as the implement 10 is being towed by the vehicle 12, thereby establishing rows of planted seeds. In some embodiments, the bulk of the seeds to be planted may be stored in one or more hoppers or seed tanks 46 mounted on or otherwise supported by the toolbar 28. Thus, as seeds are planted by the row units 44, a pneumatic distribution system (not shown) may distribute additional seeds from the seed tanks 46 to the individual row units 44. Additionally, one or more fluid tanks 48 mounted on or otherwise supported by the toolbar 28 may store agricultural fluids, such as insecticides, herbicides, fungicides, fertilizers, and/or the like, which may be sprayed onto the seeds during planting.

It should be appreciated that, for purposes of illustration, only a portion of the row units 44 of the implement 10 have been shown in FIG. 2. In general, the implement 10 may include any number of row units 44, such as six, eight, twelve, sixteen, twenty-four, thirty-two, or thirty-six row units. In addition, it should be appreciated that the lateral spacing between row units 44 may be selected based on the type of crop being planted. For example, the row units 44 may be spaced approximately thirty inches from one another for planting corn, and approximately fifteen inches from one another for planting soybeans.

Furthermore, a soil moisture sensor 104 may be provided operative association with the implement 10. For instance, as shown in FIG. 2, the soil moisture sensor 104 is installed on or within the implement 10. However, in other embodiments, the soil moisture sensor 104 may be installed on or within the vehicle 12. In general, the soil moisture sensor 104 may be configured to detect a parameter associated with the moisture content of the soil within the field across which the implement 10 is being moved. For example, in one embodiment, the soil moisture sensor 104 may be configured as an optical sensor configured to detect one or more characteristics of light reflected by the soil, with such characteristics generally being indicative of the soil moisture content. However, it should be appreciated that, in alternative embodiments, the soil moisture sensor 104 may be configured as any other suitable device for sensing or detecting the moisture content of the soil.

Figure 3:
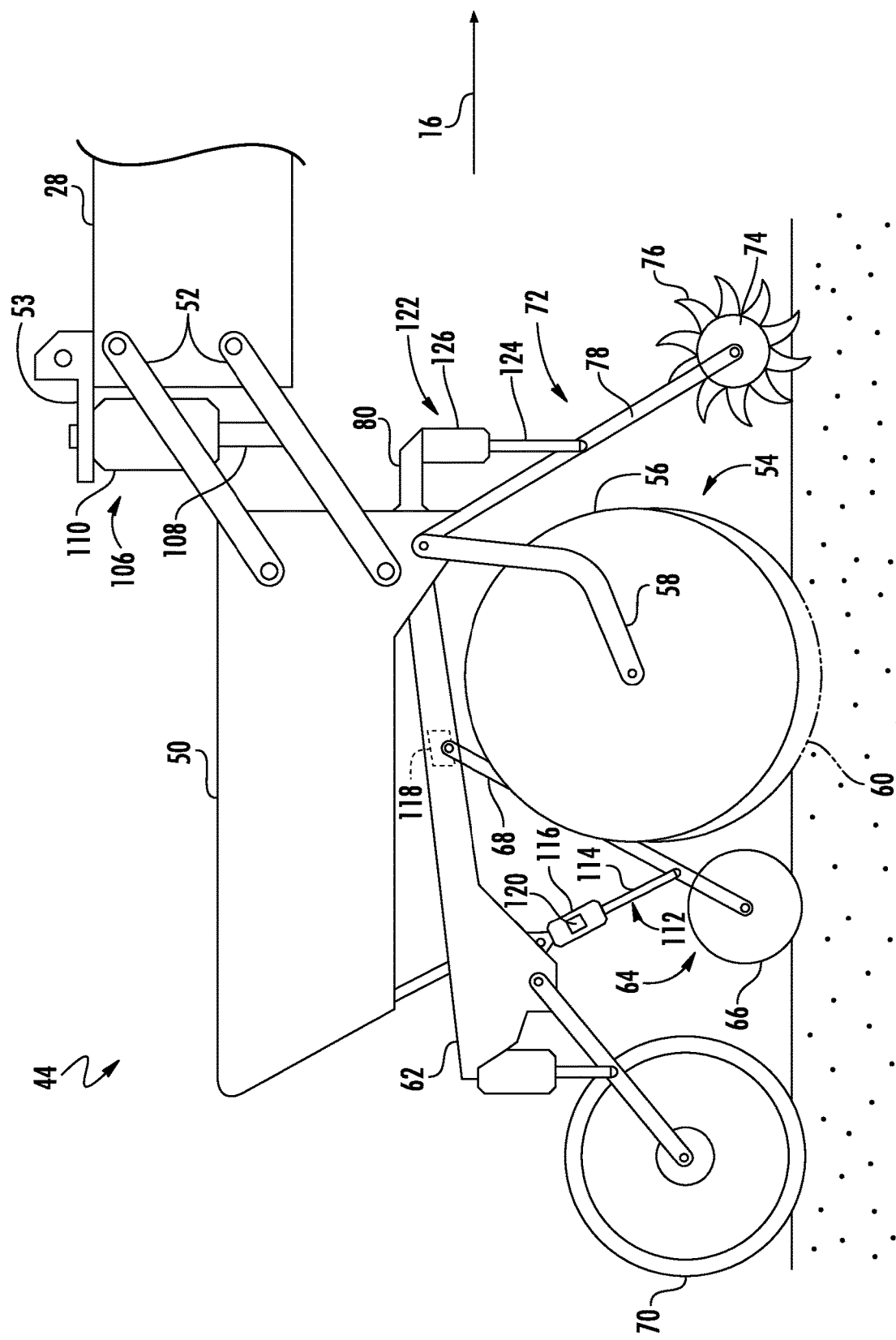
FIG. 3 illustrates a side view of one embodiment of a row unit suitable for use with a seed-planting implement in accordance with aspects of the present subject matter.

Referring now to FIG. 3, a side view of one embodiment of a row unit 44 is illustrated in accordance with aspects of the present subject matter. As shown, the row unit 44 may include a frame 50 adjustably coupled to the toolbar 28 by links 52. For example, one end of each link 52 may be pivotably coupled to the frame 50, while an opposed end of each link 52 may be pivotably coupled to the toolbar 28. In one embodiment, the links 52 may be parallel. However, it should be appreciated that, in alternative embodiments, the row unit 44 may be coupled to the toolbar 28 in any other suitable manner. For example, the links 52 may be fixedly coupled to the frame 50 and/or the links 52 may be non-parallel. Additionally, in a further embodiment, the implement 10 may not include the links 52. In such instance, the implement 10 may include other components for coupling each row unit 44 to the toolbar 28.

As shown in FIG. 3, the row unit 44 may include a row unit actuator 106 configured to move or otherwise adjust the position of the row unit 44 relative to the toolbar 28. For example, as shown, in the one embodiment, a first end of the actuator 106 (e.g., a rod 108 of the actuator 106) may be coupled to the one of the links 52, while a second end of the actuator 106 (e.g., the cylinder 110 of the actuator 106) may be coupled to a bracket 53, which is, in turn, coupled to the toolbar 28. The rod 108 of the actuator 106 may be configured to extend and/or retract relative to the cylinder 110 to adjust the down pressure applied to row unit 44 (and the various components of the row unit 44, such as a gauge wheel). In the illustrated embodiment, the actuator 106 corresponds to a fluid-driven actuator, such as hydraulic or pneumatic cylinder. However, it should be appreciated that the actuator 106 may correspond to any other suitable type of actuator, such as an electric linear actuator.

In several embodiments, the row unit 44 also includes a furrow-opening assembly 54. For example, in one embodiment, the furrow-opening assembly 54 may include a gauge wheel 56 operatively coupled to the frame 50 of the row unit 44 via a support arm 58. Furthermore, the opening assembly 54 may also include one or more opener discs 60 configured to excavate a furrow or trench in the soil. In general, the gauge wheel 56 may be configured to engage the top surface of the soil as the implement 10 is moved across the field. In this regard, the height of the opener disc(s) 60 may adjusted with respect to the position of the gauge wheel 56 to set the desired depth of the furrow being excavated.

Moreover, as shown, the row unit 44 may include a furrow-closing assembly 64. Specifically, in several embodiments, the furrow-closing assembly 64 may include a pair of closing discs 66 (only one is shown in FIG. 3) positioned relative to each other in a manner that permits soil to flow between the discs 66 as the implement 10 is moved across the field. As such, the closing discs 66 may be configured to penetrate the soil in a manner that collapses the furrow, thereby closing the furrow after seeds have been deposited therein. Furthermore, the furrow-closing assembly 64 may include a support arm 68 configured to adjustably couple the closing discs 66 to the frame assembly 50. For example, one end of the support arm 68 may be pivotably coupled to the closing discs 66, while an opposed end of the support arm 68 may be pivotably coupled to the chassis arm 62, which is, in turn, coupled to the frame 50. However, in alternative embodiments, the closing discs 66 may be coupled to the frame 50 in any other suitable manner. Furthermore, in alternative embodiments, the furrow-closing assembly 64 may include any other suitable number of closing discs 66, such as one closing disc 66 or three or more closing discs 66. Additionally, the row unit 44 may include a press wheel 70 configured to roll over the closed furrow to firm the soil over the seed and promote favorable seed-to-soil contact.

In accordance with aspects of the present subject matter, a furrow-closing assembly actuator 112 may be configured to move or otherwise adjust the position of the closing discs 66 relative to the frame 50. For example, as shown in the illustrated embodiment, a first end of the actuator 112 (e.g., a rod 114 of the actuator 112) may be coupled to the support arm 68 of the furrow-closing assembly 64, while a second end of the actuator 112 (e.g., the cylinder 116 of the actuator 112) may be coupled to the chassis arm 62, which is, in turn, coupled to the frame 50. The rod 114 of the actuator 112 may be configured to extend and/or retract relative to the cylinder 116 to adjust the down pressure applied to the closing discs 66. Adjusting the down pressure applied to the closing discs 66 may, in turn, adjust the penetration depth of the discs 66. For example, the actuator 112 may increase the penetration depth of the closing discs 66 by increasing the down pressure applied thereto. Conversely, the actuator 112 may reduce the penetration depth of the closing discs 66 by decreasing the down pressure applied thereto. In alternative embodiments, the furrow-closing actuator 112 may be configured to adjust the penetration depth of the closing discs 66 by adjusting the position of the furrow-closing assembly 64 relative to the furrow-opening assembly 54 or gauge wheel 56 as the furrow depth may generally affect the target penetration depth of the closing disc 66. In the illustrated embodiment, the actuator 112 corresponds to a fluid-driven actuator, such as hydraulic or pneumatic cylinder. However, it should be appreciated that the actuator 112 may correspond to any other suitable type of actuator, such as an electric linear actuator.

Furthermore, a depth sensor 118 may be provided in operative association with the furrow-closing assembly 64. In general, the depth sensor 118 may be configured to detect a parameter associated with the depth to which the closing discs 66 penetrate soil. For example, in one embodiment, the depth sensor 118 may be configured as a potentiometer configured to detect the angle defined between the support arm 68 on which the closing discs 66 are mounted and the chassis arm 62 to which the support arm 68 is coupled. The angle between the support arm 68 and the chassis arm 62 may, in turn, be indicative of the penetration depth of the closing discs 66. However, in alternative embodiments, the depth sensor 118 may be configured as any other suitable device for sensing or detecting the penetration depth of the closing discs 66. For example, in one embodiment, the depth sensor 118 may be configured to detect the position of the rod 114 of the furrow-closing actuator 112 relative to the cylinder 116 of the actuator 112, which may, in turn, be indicative of the penetration depth of the closing discs 66.

Additionally, a down pressure sensor 120 may be provided in operative association with the furrow-closing assembly 64. In general, the down pressure sensor 120 may be configured to detect a parameter associated with the down pressure applied to the closing discs 66. For example, in one embodiment, the down pressure sensor 120 may be configured as a pressure sensor configured to detect the fluid pressure within the furrow-closing assembly actuator 112 (e.g., within the cylinder 116) or an associated fluid conduit. The pressure within the actuator 112 may, in turn, be indicative of the down pressure applied to the closing discs 66. However, it should be appreciated that, in alternative embodiments, the down pressure sensor 120 may be configured as any other suitable device for sensing or detecting the penetration depth of the closing discs 66.

In several embodiments, a residue removal device 72 may be positioned at the forward end of the row unit 44 relative to the direction of travel 14. In this regard, the residue removal device 72 may be configured to break up and/or sweep away residue, dirt clods, and/or the like from the path of the row unit 44 before the furrow is formed in the soil. For example, in one embodiment, the residue removal device 72 may include one or more residue removal wheels 74, with each wheel 74 having a plurality of tillage points or fingers 76. As such, the wheel(s) 74 may be configured to roll relative to the soil as the implement 10 is moved across the field such that the fingers 76 break up and/or sweep away residue and dirt clods. Additionally, the residue removal device 72 may include a support arm 78 configured to adjustably couple the residue removal wheel(s) 74 to the frame 50. For example, one end of the support arm 78 may be pivotably coupled to the wheel(s) 74, while an opposed end of the support arm 78 may be pivotably coupled to a bracket 80, which is, in turn, coupled to the frame 50. However, in alternative embodiments, the residue removal wheel(s) 72 may be coupled to the frame 50 in any other suitable manner.

Furthermore, although only one residue removal wheel 74 is shown in FIG. 3, it should be appreciated that, in alternative embodiments, the residue removal device 72 may include any other suitable number of residue removal wheels 74. For example, in one embodiment, the residue removal device 72 may include a pair of residue removal wheels 74.

In several embodiments, a residue removal device actuator 122 may be configured to move or otherwise adjust the position of the residue removal device 72 relative to the frame 50. For example, as shown in the illustrated embodiment, a first end of the actuator 122 (e.g., a rod 124 of the actuator 122) may be coupled to the support arm 78 of the residue removal device 72, while a second end of the actuator 122 (e.g., the cylinder 126 of the actuator 122) may be coupled to the bracket 80, which is, in turn, coupled to the frame 50. The rod 124 of the actuator 122 may be configured to extend and/or retract relative to the cylinder 126 to adjust the down pressure applied to the residue removal wheel(s) 74. As such, increasing the down pressure applied to the residue removal wheel(s) 74 may increase the aggressiveness with which the removal wheel(s) 74 breaks up and sweeps away the residue and/or dirt clods. Conversely, decreasing the down pressure applied to the residue removal wheel(s) 74 may decrease the aggressiveness with which the removal wheel(s) 74 breaks up and sweeps away the residue and/or dirt clods. In the illustrated embodiment, the actuator 122 corresponds to a fluid-driven actuator, such as hydraulic or pneumatic cylinder. However, in alternative embodiments, the actuator 122 may correspond to any other suitable type of actuator, such as an electric linear actuator.

It should be further appreciated that the configuration of the seed-planting implement 10 and the work vehicle 12 described above and shown in FIGS. 1-3 is provided only to place the present subject matter in an exemplary field of use. Thus, it should be appreciated that the present subject matter may be readily adaptable to any manner of implement and/or vehicle configuration.

Figure 4:
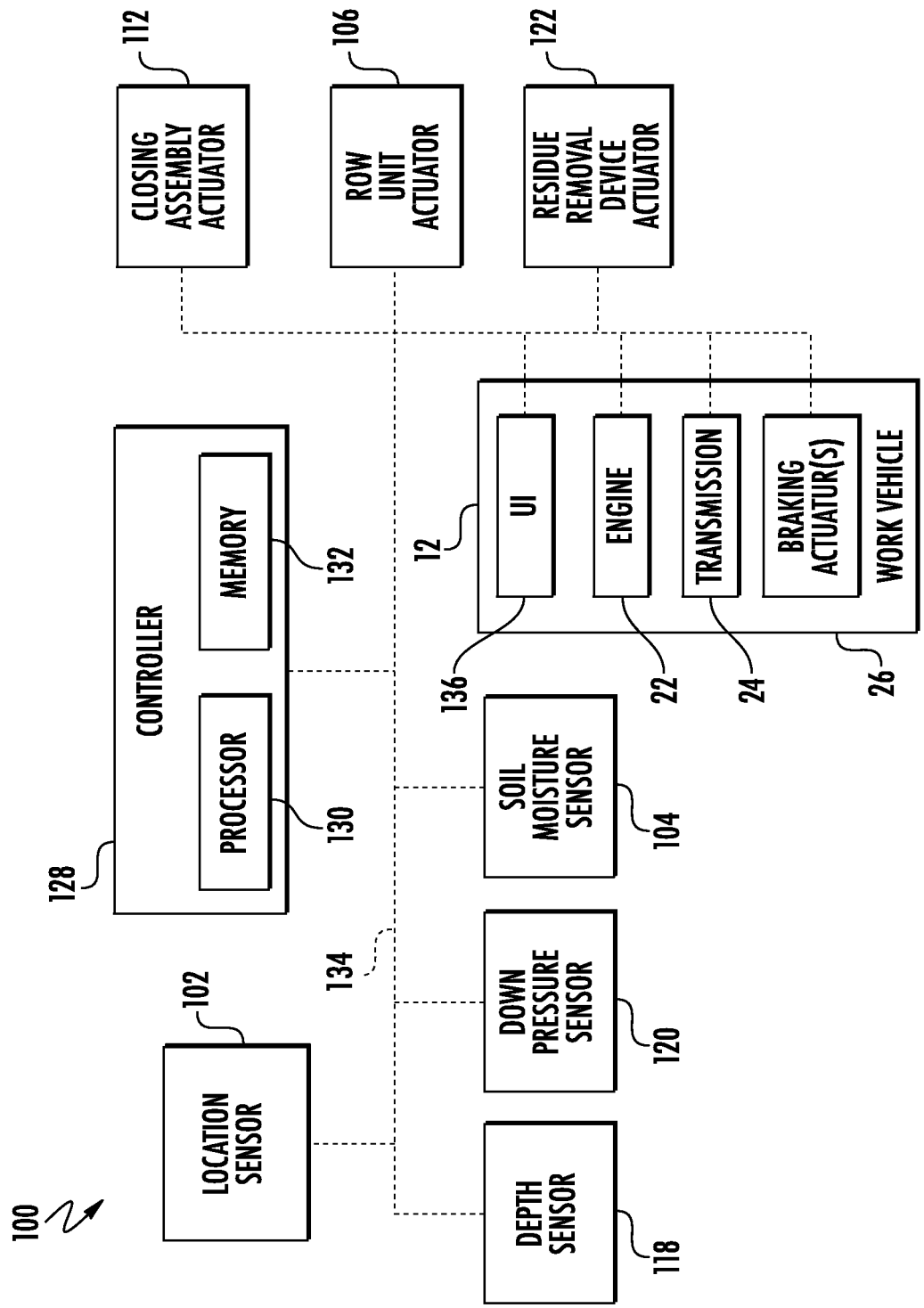
FIG. 4 illustrates a schematic view of one embodiment of a system for controlling the operation of a seed-planting implement in accordance with aspects of the present subject matter.

Referring now to FIG. 4, a schematic view of one embodiment of a system 100 for controlling the operation of a seed-planting implement is illustrated in accordance with aspects of the present subject matter. In general, the system 100 will be described herein with reference to the seed-planting implement 10 and the work vehicle 12 described above with reference to FIGS. 1-3. However, it should be appreciated by those of ordinary skill in the art that the disclosed system 100 may generally be utilized with implements having any other suitable implement configuration and/or vehicles having any other suitable vehicle configuration.

As shown in FIG. 4, the system 100 may include a controller 128 positioned on and/or within or otherwise associated with the implement 10 or the vehicle 12. In general, the controller 128 may comprise any suitable processor-based device known in the art, such as a computing device or any suitable combination of computing devices. Thus, in several embodiments, the controller 128 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 132 of the controller 128 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 132 may generally be configured to store suitable computer-readable instructions that, when implemented by the processor(s) 130, configure the controller 128 to perform various computer-implemented functions.

In addition, the controller 128 may also include various other suitable components, such as a communications circuit or module, a network interface, one or more input/output channels, a data/control bus and/or the like, to allow controller 128 to be communicatively coupled to any of the various other system components described herein (e.g., the sensors 102, 104, 118, 120; the actuators 106, 112, 122; and the vehicle components 22, 24, 26). For instance, as shown in FIG. 4, a communicative link or interface 134 (e.g., a data bus) may be provided between the controller 128 and the components 22, 24, 26, 102, 104, 106, 112, 118, 120, 122 to allow the controller 128 to communicate with such components 22, 24, 26, 102, 104, 106, 112, 118, 120, 122 via any suitable communications protocol (e.g., CANBUS).

It should be appreciated that the controller 128 may correspond to an existing controller(s) of the implement 10 and/or the vehicle 12 itself, or the controller 128 may correspond to a separate processing device. For instance, in one embodiment, the controller 128 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 128 may be performed by a single processor-based device or may be distributed across any number of processor-based devices, in which instance such devices may be considered to form part of the controller 128. For instance, the functions of the controller 108 may be distributed across multiple application-specific controllers, such as a navigation controller, an engine controller, an implement controller, and/or the like.

Furthermore, in one embodiment, the system 100 may also include a user interface 136. More specifically, the user interface 136 may be configured to provide feedback (e.g., feedback or input associated with the operation of the implement 10) to the operator of the implement/vehicle 10/12. As such, the user interface 136 may include one or more feedback devices (not shown), such as display screens, speakers, warning lights, and/or the like, which are configured to provide feedback from the controller 128 to the operator. The user interface 136 may, in turn, be communicatively coupled to the controller 128 via the communicative link 134 to permit the feedback to be transmitted from the controller 128 to the user interface 136. In addition, some embodiments of the user interface 136 may include one or more input devices (not shown), such as touchscreens, keypads, touchpads, knobs, buttons, sliders, switches, mice, microphones, and/or the like, which are configured to receive user inputs from the operator. In one embodiment, the user interface 136 may be mounted or otherwise positioned within a cab of the vehicle 12. However, in alternative embodiments, the user interface 136 may mounted at any other suitable location.

In several embodiments, the controller 128 may be configured to determine when the penetration depth of the closing discs 66 of the implement 10 falls outside of a predetermined depth range. Specifically, as the implement 10 is moved across the field in the direction of travel 14, the closing discs 66 may penetrate the soil to collapse or otherwise close the furrow after seeds have been deposited therein. In general, when the penetration depth of the closing discs 66 is within a predetermined depth range, the closing discs 66 may close the furrow in a manner that provides good seed-to-soil contact. However, when the penetration depth falls outside of such range (thereby indicating that the closing discs 66 are too deep or too shallow), poor seed-to-soil contact may result. In this regard, as the implement 10 is moved across the field, the controller 128 may receive sensor data from the depth sensor 118 (e.g., via the communicative link 134). As such, the controller 128 may be configured to process/analyze the sensor data to determine or estimate the penetration depth of the closing discs 66. For instance, the controller 128 may include a look-up table(s), suitable mathematical formula, and/or algorithms stored within its memory 132 that correlates the received sensor data to the penetration depth of the closing discs 66. Thereafter, the controller 128 may be configured to compare the determined penetration depth to the predetermined depth range to determine when the penetration depths of the closing discs 66 falls outside of the range.

Additionally, the controller 128 may be configured to control an actuator of the implement 10 to maintain the penetration depth of the closing discs 66 within the predetermined depth range. Specifically, in several embodiments, when the monitored penetration depth of the closing discs 66 falls outside of the predetermined depth range, the controller 128 may be configured to control the operation of the furrow-closing assembly actuator 112 to adjust the down pressure applied to the closing discs 66 to return the monitored penetration depth of the closing discs 66 to within the predetermined range. For example, the controller 128 may be configured to transmit instructions to the actuator 112 (e.g., via the communicative link 134) instructing the actuator 112 to adjust the down pressure applied to the closing discs 66, such as from a first or initial down pressure to a second or adjusted down pressure. The pressure adjustment from the first down pressure to the second down pressure may, in turn, return the monitored penetration depth of the closing discs 66 to within the predetermined range. As such, when the monitored depth falls below a minimum penetration depth of the range, the actuator 112 may be instructed to increase the down pressure applied to the closing discs 66 from a lower down pressure to a greater down pressure. Such an increase in down pressure may increase the penetration depth of the closing discs 66 to return the monitored penetration depth of the discs 66 to within the predetermined range. Conversely, the actuator 112 may be instructed to adjust the down pressure applied to the closing discs 66 from a greater down pressure to a lower down pressure when the monitored depth exceeds a maximum penetration depth of the range to decrease the penetration depth of the discs 66. Such a decrease in down pressure may decrease the penetration depth of the closing discs 66 to return the monitored penetration depth of the discs 66 to within the predetermined range.

Furthermore, the controller 128 may be configured to monitor the down pressure applied to the closing discs 66. As described above, the furrow-closing assembly actuator 112 may adjust the down pressure applied to the closing discs 66 as the implement 10 is moved across the field to maintain the penetration depth of the discs 66 within the predetermined depth range. In this regard, the controller 128 may receive the sensor data from the down pressure sensor 120 (e.g., via the communicative link 134). Thereafter, the controller 128 may be configured to process/analyze the received sensor data to determine or estimate the down pressure applied to the closing discs 66. For instance, the controller 128 may include a look-up table(s), suitable mathematical formula, and/or algorithms stored within its memory 132 that correlates the received sensor data to the down pressure applied to the closing discs 66. The monitored down pressure data may then be stored within the memory 132 of the controller 128 or transmitted to the user interface 136 (e.g., via the communicative link 134) for display to the operator. As will be described below, in such instances, the soil may be excessively "tight" such that it may be necessary to make one or more operational adjustments to the implement 10 (e.g., adjusting the down pressure applied to the gauge wheel(s) 56.

In one embodiment, the controller 128 may be configured to generate a field map based on the recorded down pressure and/or penetration depth measurements. More specifically, as the implement 10 is moved across the field, the controller 128 may be configured to receive location data (e.g., coordinates) from the location sensor 102 (e.g., via the communicative link 134). Based on the known dimensional configuration and/or relative positioning between the closing discs 66 and the location sensor 102, the controller 128 may be configured to geo-locate each down pressure and/or penetration depth measurement within the field. For example, in one embodiment, the coordinates derived from the location sensor 102, the down pressure measurements derived from the seedbed down pressure sensor 120, and the penetration depth measurements derived from the depth sensor 118 may each be time-stamped. In such an embodiment, the time-stamped data may allow the down pressure and/or penetration depth measurements to be matched or correlated to a corresponding set of location coordinates received or derived from the location sensor 102. Thereafter, the controller 128 may be configured to generate a field map (e.g., a graphical field map) illustrating the down pressure applied to the closing discs 66, the adjustment made to the down pressure applied to the closing discs 66 at various positions within the field, and/or the penetration depths of the closing discs 66. For instance, the controller 128 may be configured to execute one or more algorithms stored within its memory 132 that generate the field map based on the determined down pressure and/or penetration depth values and the data received from the location sensor 102. In one embodiment, the controller 128 may be configured to transmit instructions to the user interface 136 (e.g., the communicative link 134) instructing the user interface 136 to display the field map (e.g., a graphical field map).

In accordance with aspects of the present subject matter, the controller 128 may be configured to determine one or more operational adjustments to be made to an additional tool of the implement 10. In general, the operation of the tools (e.g., the gauge wheel 56, the residue removal device 72, and/or the like) mounted on the implement 10 forward of the closing assembly 64 relative to the direction of travel 14 may affect the operation of the closing assembly 64. For example, when a high down pressure is applied to the gauge wheel 56, the soil adjacent to the furrow may be compacted, thereby causing the penetration depth of the closing discs 66 to decrease. As such, in several embodiments, the controller 128 may be configured to determine one or more operational adjustments to an additional tool of the implement 10 based on the down pressure adjustment made to the closing discs 66.

It should be appreciated that an "additional tool" of the implement corresponds to any tool on the implement 10 other than the closing assembly 64. For example, the additional tool may be the gauge wheel 56, the opener disc(s) 60, the residue removal device 72, the press wheel 70, and/or the like. Moreover, the additional tool may be located forward of or aft of the closing assembly 64 relative to the direction of travel 14.

In several embodiments, the controller 128 may be configured to determine the operational adjustment(s) based on the differential between the first or initial down pressure applied to the closing discs 66 and subsequent or second or adjusted down pressure applied to the closing discs 66. As described above, the down pressure applied to the closing discs 66 may be adjusted from a first or initial down pressure to a second or adjusted down pressure to return the monitored penetration depth of the closing discs 66 to within the predetermined depth range. When the adjusted down pressure differs from the initial down pressure by more than a predetermined amount, the closing discs 66 may have encountered an undesirable field condition (e.g., compacted soil, high residue coverage, and/or the like) that may be remedied by an operational adjustment(s) to the additional tool. As such, the controller 128 may compare the initial and adjusted down pressures to determine the differential therebetween. Thereafter, the controller 128 may determine the operational adjustment(s) to be made to the additional tool based such differential. For instance, the controller 128 may include a look-up table(s) and/or a suitable algorithm(s) stored within its memory 132 that correlates the determined differential to the appropriate operational adjustment.

Additionally, in several embodiments, the controller 128 may be configured to determine the operational adjustment(s) based on the value of the adjusted down pressure following the down pressure adjustment made to return the monitored penetration depth to within the predetermined depth range. When the adjusted down pressure exceeds and/or falls below a predetermined value, the closing discs 66 may have encountered an undesirable field condition (e.g., compacted soil, high residue coverage, and/or the like) that may be remedied by an operational adjustment(s) to the additional tool. As such, the controller 128 may be configured to compare the adjusted down pressure to one or more predetermined down pressure thresholds. Each threshold may, in turn, be associated with an operational adjustment to be made. In this regard, the controller 128 may determine the operational adjustment(s) based on the threshold(s) that the adjusted down pressure has exceeded or fallen below.

Furthermore, the controller 128 may be configured to determine the operational adjustment(s) based on a stored field map and the down pressure adjustment to the closing discs 66. Various field conditions may necessitate the down pressure adjustment to the closing discs 66. For example, both soil compaction and high residue coverage may require an increase in the down pressure needed to maintain the penetration depth of the closing discs 66 within the predetermined depth range. However, different operational adjustments may be needed to correct soil compaction (e.g., a reduction of the down pressure applied to the gauge wheel 56) and high residue coverage (e.g., an increase in the down pressure applied to the residue removal device 72). As such, in several embodiments, the controller 128 may include a field map generated during a previous agricultural operation (e.g., a tillage operation) stored within its memory 132. The map may, in turn, illustrate or geolocate a field condition (e.g., residue coverage) at various locations within the field. As such, as the implement 10 is moved across the field, the controller 128 may be configured to monitor the field condition based on the map and location data received from the location sensor 102. Thereafter, when it is determined that an operational adjustment(s) is to be made to the additional tool, the controller 128 may determine such adjustment(s) based on the field condition at the current location of the implement 10 and the down pressure adjustment to the closing discs 66.

In one embodiment, the field condition illustrated in the stored field map may correspond to residue coverage (e.g., percent residue coverage). In such embodiment, as the implement 10 is moved across the field, the controller 128 may monitor the residue coverage of the field based on the stored field map. When it is determined that an operational adjustment(s) is to be made to the additional tool, the controller 128 may determine such adjustment(s) based on the residue coverage at the current location of the implement 10 and the down pressure adjustment to the closing discs 66. For example, when the residue coverage exceeds a predetermined percentage threshold, the controller 128 may determine that the down pressure adjustment to the closing discs 66 was necessitated by high residue coverage. In such instances, the controller 128 may determine that an operational adjustment(s) should be made to the residue removal device 72 (e.g., increasing the down pressure applied thereto). Conversely, when the residue coverage falls below the predetermined percentage threshold, the controller 128 may determine that the down pressure adjustment to the closing discs 66 was necessitated by soil compaction. In such instances, the controller 128 may determine that an operational adjustment(s) should be made to the gauge wheel 56 (e.g., decreasing the down pressure applied thereto).

Moreover, the controller 128 may be configured to monitor the soil moisture content of the field at the current location of the implement 10 within the field. As described above, the soil moisture sensor 104 may be configured to detect a parameter associated with the moisture content of the soil within the field across which the implement 10 is being moved. In this regard, as the implement 10 is moved across the field, the controller 128 may receive the sensor data from the soil moisture sensor 104 (e.g., via the communicative link 134). Thereafter, the controller 128 may be configured to process/analyze the received sensor data to determine or estimate the soil moisture content of the field at the current location of the implement 10. For instance, the controller 128 may include a look-up table(s), suitable mathematical formula, and/or algorithms stored within its memory 132 that correlates the received sensor data to the soil moisture content of the field.

In addition, the controller 128 may be configured to determine the operational adjustment(s) to be made to the additional tool based on the monitored soil moisture content and the down pressure adjustment to the closing discs 66. More specifically, the soil moisture content of the field may be indicative of the field condition necessitating the down pressure adjustment to the closing discs 66. For example, when the soil moisture content is high (i.e., the soil is "wet"), large amounts of residue may be sticking the soil surface, thereby requiring an increase in down pressure to maintain the penetration depth of the closing discs 66 within the predetermined range. Conversely, when the soil moisture content is low (i.e., the soil is "dry"), an increase in the down pressure needed to maintain the penetration depth of the closing discs 66 within the predetermined range may be caused by soil compaction (e.g., from the gauge wheel 56). In this regard, when it is determined that an operational adjustment(s) is to be made to an additional tool of the implement 10, the controller 128 may determine such adjustment(s) based on the soil moisture content at the current location of the implement 10 and the down pressure adjustment to the closing discs 66. For example, when the soil moisture content exceeds a predetermined moisture threshold, the controller 128 may determine that the residue coverage is sticking to the soil surface and an operational adjustment(s) to the residue removal device 72 should be made to address such sticking (e.g., increasing the down pressure applied to the device 72). Conversely, when the soil moisture falls below the predetermined threshold, the controller 128 may determine that the soil is being compacted and an operational adjustment(s) to the gauge wheel 56 should be made to address such compaction (e.g., decreasing the down pressure applied to the wheel 56).

After the controller 128 has determined the operational adjustment(s) to be made to the additional tool, the controller 128 may be configured to control the operation of the additional tool to execute the operational adjustment(s). As described above, the row unit actuator 106 may be configured to apply a down pressure on the row unit 44. This down pressure may, in turn, cause the opener disc(s) 60 to penetrate the soil, thereby forming the furrow. Moreover, this down pressure may also cause the gauge wheel 56 to engage the soil forming a side wall of the furrow such that the gauge wheel 56 applies a down pressure on the side wall. The down pressure applied to the side wall by the gauge wheel 56 may result in soil compaction, which may make it more difficult for the closing disc(s) 66 to penetrate the side wall to the desired depth (to facilitate proper closing of the furrow). As such, in one embodiment, the additional tool may correspond to the gauge wheel 56. In such embodiment, the controller 128 may be configured to control the operation of the row unit actuator 106 to execute the operational adjustment(s). For example, the controller 128 may be configured to transmit instructions to the actuator 106 (e.g., via the communicative link 134) instructing the actuator 106 to indirectly adjust the down pressure applied to the gauge wheel 56. Such operational adjustment may result in decreased compaction of side wall, thereby enabling the closing disc(s) 66 to properly close the furrow. However, in alternative embodiments, the controller 128 may be configured to adjust the down pressure applied to the gauge wheel 56 in any other suitable manner, such as by adjusting the operation of any actuator that directly applies down pressure on the gauge wheel 56 or indirectly applies down pressure on the gauge wheel 56 (e.g., by applying a down pressure to the frame 50 or other component to which the gauge wheel 56 is coupled).

In another embodiment, the additional tool may correspond to the residue removal device 72. In such embodiment, the controller 128 may be configured to control the operation of the residue removal device actuator 122 to execute the operational adjustment(s). For example, the controller 128 may be configured to transmit instructions to the actuator 122 (e.g., via the communicative link 134) instructing the actuator 122 to adjust the down pressure applied to the associated residue removal wheel(s) 74. However, in alternative embodiments, the controller 128 may be configured to control any other suitable actuator of the implement 10 to execute an operational adjustment(s) on any other tool of the implement 10 (e.g., the press wheel 70).

In several embodiments, the controller 128 may be configured to determine and execute operational adjustments to a plurality of additional tools of the implement 10. In certain instances, the operational adjustment(s) to a single additional tool of the implement 10 may be insufficient to alleviate the field conditions that the necessitated the down pressure adjustments to the closing discs 66. For example, a reduction in the down pressure applied to the gauge wheel 56 may reduce the soil compaction encountered by the closing discs 66, but high residue coverage may have contributed to the required down pressure adjustment(s) to the closing discs 66. That is, even after reducing the down pressure applied to the gauge wheel 56, it may still be necessary to increase the down pressure applied to the residue removal device 72. Specifically, in such embodiments, the controller 128 may be configured to determine and execute one or more operational adjustments to a first additional tool of the implement 10 based on the down pressure adjustment to the closing discs 66 as described above. After such operational adjustment(s) are executed, the controller 128 may be configured to monitor the penetration depth of and/or the down pressure applied to the closing discs 66. Based on the monitored penetration depth and/or down pressure, the controller 128 may be configured to determine and execute one or more operational adjustments to a second additional tool of the implement. The operational adjustment(s) to the second additional tool may be determined and executed as described above. The controller 128 may repeat this process for further additional tools of the implement (e.g., a third additional tool, a fourth additional tool, and so on).

In one embodiment, the controller 128 may be configured to sequentially determine and execute the operational adjustment(s) on the tools of the implement 10 moving from the closing assembly 64 forward relative the direction of the travel 14. In such embodiment, the second additional tool may be positioned forward of the first additional tool relative to the direction of travel 14. For example, the first additional tool may correspond to the gauge wheel 56, while second additional tool may correspond to the residue removal device 72. Furthermore, when the closing assembly 64 cannot achieve the target penetration depth due to excessively tight soils (e.g. closing system is not capable of penetrating to target depth without applying downforce which exceeds a target threshold to the furrow-closing assembly actuator 112), the controller 128 may initiate operational adjustments to the gauge wheel 56 first followed by adjustments to the residue removal device 72 in an effort to reduce soil tightness. However, in alternative embodiments, the controller 128 may be configured to determine and execute operational adjustments to the additional tools of the implement 10 in any other suitable order (e.g., from a forward end of the implement 10 rearward) or simultaneously.

Furthermore, in several embodiments, the controller 128 may be configured to determine one or more drive parameter adjustments to be made to the vehicle 12. In certain instances, the operational adjustment(s) to the additional tool(s) of the implement 10 may be insufficient to alleviate the field conditions that the necessitated the down pressure adjustments to the closing discs 66. In such instances, the drive parameter(s) (e.g., the ground speed) of the vehicle 12 may have contributed to the down pressure adjustments to the closing discs 66. As such, after the operational adjustment(s) to the additional tool(s) of the implement 10 have been executed, the controller 128 may be configured to monitor the penetration depth of and/or the down pressure applied to the closing discs 66. Based on the monitored penetration depth and/or down pressure, the controller 128 may be configured to determine and execute one or more drive parameter adjustments to the vehicle 12, such as an adjustment to the ground speed of the vehicle 12. For instance, the controller 128 may include a look-up table(s) and/or a suitable algorithm(s) stored within its memory 132 that correlates the monitored penetration depth and/or down pressure to the appropriate drive parameter adjustment.

In one embodiment, after the controller 128 has determined the drive parameter adjustment(s) to be made to the vehicle 12, the controller 128 may be configured to notify the operator of implement/vehicle 10/12 of such adjustment(s). Specifically, in one embodiment, the controller 128 may be configured to transmit instructions to the user interface 136 (e.g., the communicative link 134) instructing the user interface 136 to provide a notification to the operator of the implement/vehicle 10/12 (e.g., by causing a visual or audible notification or indicator to be presented to the operator) indicating one or more drive parameter adjustments to be made to the vehicle 12. In such instances, the operator may then choose to initiate any suitable corrective action he/she believes is necessary, such as adjusting one or more drive parameters of the vehicle 12 (e.g., its ground speed).

Additionally, in one embodiment, after the controller 128 has determined the drive parameter adjustment(s) to be made to the vehicle 12, the controller 128 may be configured to automatically execute such adjustment(s). As indicated above, in one embodiment, the drive parameter(s) may correspond to an adjustment of the ground speed of the vehicle 12. In such embodiment, the controller 128 may be configured to transmit instructions to the engine 22 and/or the transmission 24 (e.g., via the communicative link 134) instructing the engine 22 and/or the transmission 24 to adjust their operation. For example, the controller 128 may instruct the engine 22 to vary its power output and/or the transmission 24 to upshift or downshift to adjust the ground speed of the vehicle 12. However, in alternative embodiments, the controller 128 may be configured to transmit instructions to any other suitable components (e.g., the braking actuators 26) of the vehicle 12 to adjust the ground speed of the vehicle 12. Furthermore, in alternative embodiments, the controller 128 may be configured to execute an adjustment(s) of any other suitable drive parameter(s).

Figure 5:
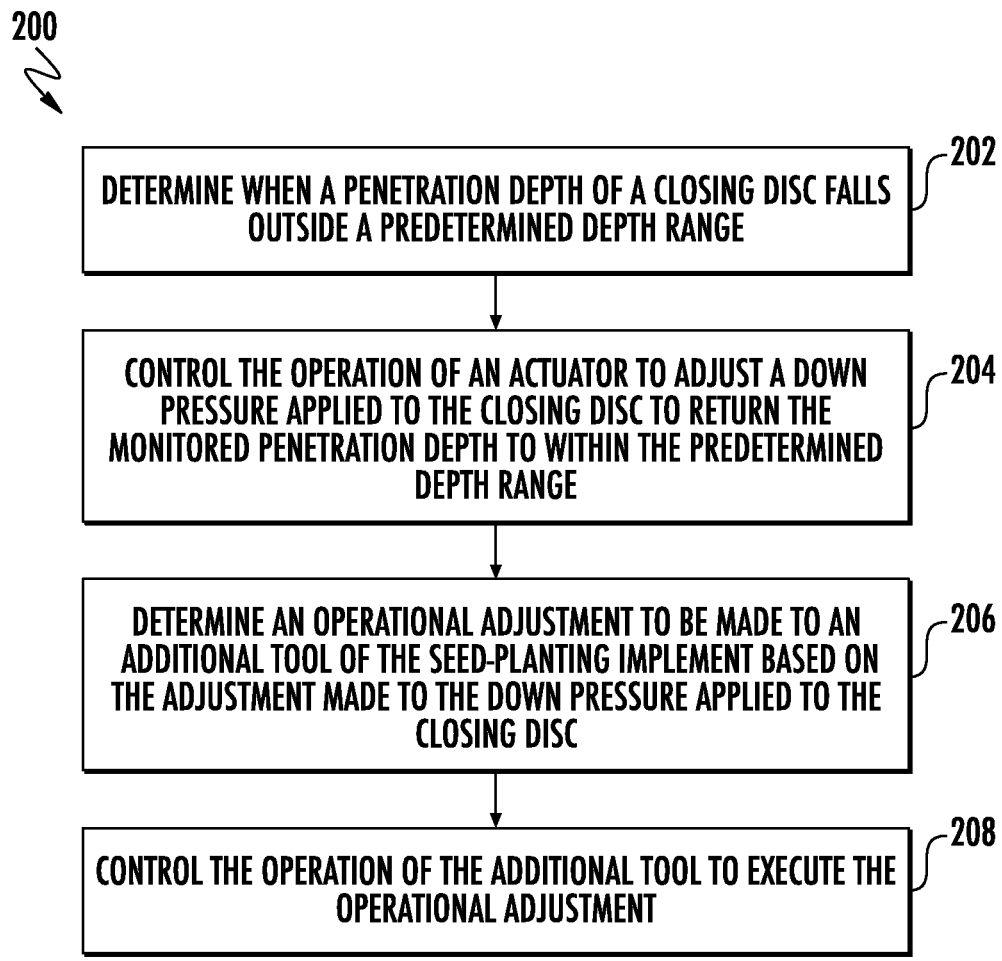
FIG. 5 illustrates a flow diagram of one embodiment of a method for controlling the operation of a seed-planting implement in accordance with aspects of the present subject matter.

Referring now to FIG. 5, a flow diagram of one embodiment of a method 200 for controlling the operation of a seed-planting implement is illustrated in accordance with aspects of the present subject matter. In general, the method 200 will be described herein with reference to the seed-planting implement 10, the work vehicle 12, and the system 100 described above with reference to FIGS. 1-4. However, it should be appreciated by those of ordinary skill in the art that the disclosed method 200 may generally be implemented with any implement having any suitable implement configuration, any vehicle having any suitable vehicle configuration, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include determining, with a computing device, when a penetration depth of a closing disc falls outside a predetermined depth range. For instance, as described above, the controller 128 may be configured to determine when a penetration depth of the closing discs 66 of a seed-planting implement 10 falls outside a predetermined depth range.

Additionally, at (204), the method 200 may include controlling, with the computing device, the operation of an actuator to adjust a down pressure applied to the closing disc to return the monitored penetration depth to within the predetermined depth range. For instance, as described above, the controller 128 may be configured to control the operation of a furrow-closing assembly actuator 112 to adjust a down pressure applied to the closing discs 66 to return the monitored penetration depth to within the predetermined depth range.

Moreover, as shown in FIG. 5, at (206), the method 200 may include determining, with the computing device, an operational adjustment to be made to an additional tool of the seed-planting implement based on the adjustment made to the down pressure applied to the closing disc. For instance, as described above, the controller 128 may be configured to determine one or more operational adjustments to be made to one or more additional tools of the seed-planting implement 10, such as the gauge wheel 56 and/or the residue removal device 72, based on the adjustment made to the down pressure applied to the closing discs 66.

Furthermore, at (208), the method 200 may include controlling, with the computing device, the operation of the additional tool to execute the operational adjustment. For instance, as described above, the controller 128 may be configured to control the operation of the additional tool(s) (e.g., the gauge wheel 56 and/or the residue removal device 72) to execute the operational adjustment(s).

It is to be understood that the steps of the method 200 are performed by the controller 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 128 described herein, such as the method 200, is implemented in software code or instructions which are tangibly stored on a tangible computer readable medium. The controller 128 loads the software code or instructions via a direct interface with the computer readable medium or via a wired and/or wireless network. Upon loading and executing such software code or instructions by the controller 128, the controller 128 may perform any of the functionality of the controller 128 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling the operation of a seed-planting implement, the system comprising:
   a furrow-closing assembly including a closing disc, the furrow-closing assembly configured to close a furrow formed in the soil by the seed-planting implement;
   an actuator configured to apply a down pressure to the closing disc in a manner that causes the closing disc to penetrate a surface of the soil;
   a depth sensor configured to detect a parameter indicative of a penetration depth of the closing disc;
   a down pressure sensor configured to detect a parameter indicative of the down pressure applied to the closing disc; and
   a controller communicatively coupled to the depth sensor and the down pressure sensor, the controller configured to:
      determine when the penetration depth of the closing disc falls outside a predetermined depth range based on data received from the depth sensor;
      control the operation of the actuator to adjust the down pressure applied to the closing disc to return the monitored penetration depth to within the predetermined depth range;
      determine an operational adjustment to be made to an additional tool of the seed-planting implement based on the adjustment made to the down pressure applied to the closing disc; and control the operation of the additional tool to execute the operational adjustment.

2. The system of claim 1, wherein the controller is further configured to:
control the operation of the actuator to adjust the down pressure applied to the closing disc from a first down pressure to a second down pressure; and
determine the operational adjustment to be made to the additional tool based on a comparison of the second down pressure to at least one of the first down pressure or one or more predetermined down pressure thresholds.

3. The system of claim 1, wherein the additional tool corresponds to a gauge wheel of the seed-planting implement and the operational adjustment corresponds to an adjustment of a down pressure applied to the gauge wheel.

4. The system of claim 1, wherein the additional tool corresponds to a residue removal device of the seed-planting implement and the operational adjustment corresponds to an adjustment of a down pressure applied to the residue removal device.

5. The system of claim 1, wherein the additional tool corresponds to a first additional tool, the controller further configured to:
monitor at least one of the penetration depth of the closing disc or the down pressure applied to the closing disc after the operational adjustment to the first additional tool is executed;
determine an operational adjustment to be made to a second additional tool of the seed-planting implement based on the at least one of the monitored penetration depth of the closing disc or the monitored down pressure applied to the closing disc, the second additional tool being positioned forward of the first additional tool relative to a direction of travel of the seed-planting implement; and
control the operation of the second additional tool to execute the operational adjustment to the second additional tool.

6. The system of claim 5, wherein the first additional tool corresponds to a gauge wheel of the seed-planting implement and the second additional tool corresponds to a residue removal device of the seed-planting implement.

7. The system of claim 1, wherein the controller is further configured to:
monitor at least one of the penetration depth of the closing disc or the down pressure applied to the closing disc after the operational adjustment to the additional tool is executed;
determine a drive parameter adjustment to be made to a work vehicle configured to tow the seed-planting implement based on the at least one of the monitored penetration depth of the closing disc or the monitored down pressure applied to the closing disc; and
provide a notification to an operator of the work vehicle associated with the drive parameter adjustment.

8. The system of claim 1, wherein the controller is further configured to:
monitor at least one of the penetration depth of the closing disc or the down pressure applied to the closing disc after the operational adjustment to the additional tool is executed;
determine a drive parameter adjustment to be made to a work vehicle configured to tow the seed-planting implement based on the at least one of the monitored penetration depth of the closing disc or the monitored down pressure applied to the closing disc; and
control of the operation of the work vehicle to execute the drive parameter adjustment.

9. The system of claim 1, wherein the controller is further configured to determine the operational adjustment to be made to the additional tool based on a field map and the adjustment made to the down pressure applied to the closing disc.

10. The system of claim 1, wherein the controller is further configured to generate a field map based on at least one of the adjustment made to the down pressure applied to the closing disc or the monitored penetration depth of the closing disc.

11. The system of claim 1, further comprising:
a soil moisture sensor configured to detect a parameter indicative of a soil moisture content of the soil, the controller communicatively coupled to the soil moisture sensor, the controller further configured to:
monitor the soil moisture content of the soil based on data received from the soil moisture sensor; and
determine the operational adjustment to be made to the additional tool based on the determined soil moisture content and the adjustment made to the down pressure applied to the closing disc.

12. A method for controlling the operation of a seed-planting implement, the seed-planting implement comprising a furrow-closing assembly including a closing disc, the furrow-closing assembly configured to close a furrow formed in the soil by the seed-planting implement, the method comprising:
determining, with a computing device, when a penetration depth of the closing disc falls outside a predetermined depth range;
controlling, with the computing device, the operation of an actuator to adjust a down pressure applied to the closing disc to return the monitored penetration depth to within the predetermined depth range;
determining, with the computing device, an operational adjustment to be made to an additional tool of the seed-planting implement based on the adjustment made to the down pressure applied to the closing disc; and
controlling, with the computing device, the operation of the additional tool to execute the operational adjustment.

13. The method of claim 12, wherein:
controlling the operation of the actuator comprises controlling, with the computing device, the operation of the actuator to adjust the down pressure applied to the closing disc from a first down pressure to a second down pressure; and
determining the operational adjustment comprises determining, with the computing device, the operational adjustment to be made to the additional tool based on a comparison of the second down pressure to at least one of the first down pressure or one or more predetermined down pressure thresholds.

14. The method of claim 12, wherein the additional tool corresponds to a gauge wheel of the seed-planting implement and the operational adjustment corresponds to an adjustment of a down pressure applied to the gauge wheel.

15. The method of claim 12, wherein the additional tool corresponds to a residue removal device of the seed-planting implement and the operational adjustment corresponds to an adjustment of a down pressure applied to the residue removal device.

16. The method of claim 12, wherein the additional tool corresponds to a first additional tool, the method further comprising:

monitoring, with the computing device, at least one of the penetration depth of the closing disc or the down pressure applied to the closing disc after the operational adjustment to the first additional tool is executed;

determining, with the computing device, an operational adjustment to be made to a second additional tool of the seed-planting implement based on the at least one of the monitored penetration depth of the closing disc or the monitored down pressure applied to the closing disc, the second additional tool being positioned forward of the first additional tool relative to a direction of travel of the seed-planting implement; and controlling, with the computing device, the operation of the second additional tool to execute the operational adjustment.

17. The method of claim 12, further comprising:

monitoring, with the computing device, at least one of the penetration depth of or the down pressure applied to the closing disc after the operational adjustment to the additional tool is executed;

determining, with the computing device, a drive parameter adjustment to be made to a work vehicle configured to tow the seed-planting implement based on the at least one of the monitored penetration depth of the closing disc or the monitored down pressure applied to the closing disc; and providing, with the computing device, a notification to an operator of the work vehicle associated with the drive parameter adjustment.

18. The method of claim 12, further comprising:

monitoring, with the computing device, at least one of the penetration depth of the closing disc or the down pressure applied to the closing disc after the operational adjustment to the additional tool is executed;

determining, with the computing device, a drive parameter adjustment to be made to a work vehicle configured to tow the seed-planting implement based on the at least one of the monitored penetration depth of the closing disc or the monitored down pressure applied to the closing disc; and controlling, with the computing device, the operation of the work vehicle to execute the drive parameter adjustment.

19. The method of claim 12, further comprising:

determining, with the computing device, the operational adjustment to be made to the additional tool based on a field map and the adjustment made to the down pressure applied to the closing disc.

20. The method of claim 12, further comprising:

generating, with the computing device, a field map based on at least one of the adjustment made to the down pressure applied to the closing disc or the monitored penetration depth of the closing disc.

* * * * *